United States Patent
Thiagarajan

(10) Patent No.: US 11,546,083 B2
(45) Date of Patent: Jan. 3, 2023

(54) METHOD, SYSTEM AND APPARATUS FOR TIME AND FREQUENCY SYNCHRONIZATION FOR HIGH SPEED MOVING PLATFORMS

(71) Applicant: MMRFIC Technology Pvt. Ltd., Bangalore (IN)

(72) Inventor: Ganesan Thiagarajan, Bengaluru (IN)

( * ) Notice: Subject to any disclaimer, the term of this patent is extended or adjusted under 35 U.S.C. 154(b) by 0 days.

(21) Appl. No.: 17/194,314

(22) Filed: Mar. 8, 2021

(65) Prior Publication Data

US 2021/0281358 A1    Sep. 9, 2021

(51) Int. Cl.
*H04L 1/00* (2006.01)
*H04B 1/06* (2006.01)
*H04B 7/0413* (2017.01)

(52) U.S. Cl.
CPC ............. *H04L 1/0036* (2013.01); *H04B 1/06* (2013.01); *H04B 7/0413* (2013.01)

(58) Field of Classification Search
CPC .... H04B 7/0413; H04B 1/06; H04B 7/18506; H04B 1/713; H04B 7/12; H04B 1/707; H04B 1/525; H04B 2001/6912; G01S 7/006; G01S 13/003; G01S 13/582; G01S 13/584; G01S 7/2886; G01S 13/95; G01S 13/524; G01S 7/288; H04L 1/0036; H04L 5/0023; H04L 27/2614; H04L 27/14; H04L 27/2602; H04L 27/103; H04L 1/04; H04L 27/2697; H04L 27/2663; H04W 56/001; H04W 40/244; H04W 52/42; H04W 88/02; H03D 7/00

See application file for complete search history.

(56) References Cited

U.S. PATENT DOCUMENTS

| | | | |
|---|---|---|---|
| 9,094,107 B1 * | 7/2015 | Kumar | H04B 17/345 |
| 2005/0163201 A1 * | 7/2005 | Krasner | H04B 1/707 375/150 |
| 2016/0011300 A1 * | 1/2016 | Lee | G01S 7/41 342/127 |
| 2017/0248678 A1 * | 8/2017 | Markhovsky | H04W 4/023 |
| 2018/0088221 A1 * | 3/2018 | Yomo | G01S 7/003 |
| 2018/0206075 A1 * | 7/2018 | Demirdag | H04W 4/027 |
| 2022/0075020 A1 * | 3/2022 | Mani | G01S 7/023 |

FOREIGN PATENT DOCUMENTS

WO    WO-2015063488 A1 *    5/2015    ......... G01S 13/003

* cited by examiner

*Primary Examiner* — Lana N Le

(57) ABSTRACT

According to an aspect, a method in a wireless communication receiver comprises receiving a radio frequency (RF) signal, delaying the RF signal with a set of time delays, shifting the RF signal with a set of offset frequencies, compressing in time the RF signal with a set of compression factors, correlating the RF signal after subjecting to said delaying, shifting and compressing in time with a reference signal, and selecting a first delay, first offset frequency, and first compression ratio that corresponds to a peak resulting from said correlating, wherein the said first delay, first offset frequency, and first compression ration representing the difference between the RF signal and the reference signal.

9 Claims, 5 Drawing Sheets

METHOD, SYSTEM AND APPARATUS FOR TIME AND FREQUENCY SYNCHRONIZATION FOR HIGH SPEED MOVING PLATFORMS

CROSS REFERENCES TO RELATED APPLICATIONS

This application claims priority from Indian patent application number 201941036377 filed on Mar. 8, 2020, which is incorporated herein in its entirety by reference.

BACKGROUND

Technical Field

Embodiments of the present disclosure relate to communication system and more particularly relate to system, method and apparatus for time and frequency measurement and synchronization.

Related Art

The time and frequency measurement and/or synchronization often refers to determining at least one of a difference, change, shift, offset between a signal transmitted by a transmitter to that of a corresponding signal received by a receiver in a communication system. The difference thus measured is used as information and/or for correction. As is well known, the synchronization or determining the shift in frequency/delay is required for accurate performance of the electronic systems.

The time and frequency synchronization becomes more complex when the sources of the reference signal (often referred to as local oscillator/reference clock) at the transmitter and/or at the receiver are not stable causing drift or deviation from the reference frequency or time. Often a high precision clock sources such as atomic clock are employed to overcome the synchronization problem due to instability of the sources. For example, in GPS satellite system, atomic clocks are employed for stability. Alternatively, a centralized control stations are deployed to control any drift/offset in the source and/or the destination.

Addition to the challenges posed by the unstable reference clocks, electronics employed in the moving platforms like the satellites, aircrafts, vehicles on ground etc., experience challenges in determining the drift, offset and delay of a transmitted signal. Further, when higher frequency signals are employed, the challenges are further enhanced.

Thus, there exists a necessity for accurately and efficiently determining the delay, drift, velocity, direction of signal arrival etc., even when the source/destination are in motion and further when high frequency signals are employed at least in applications such as radar, object detection, satellite communication, unmanned vehicle navigation, MANET and other communication system establishing communication between any moving source and/or destination.

SUMMARY

According to an aspect, a method and a system in a wireless communication receiver comprises receiving a radio frequency (RF) signal, delaying the RF signal with a set of time delays, shifting the RF signal with a set of offset frequencies, compressing in time the RF signal with a set of compression factors, correlating the RF signal after subjecting to said delaying, shifting and compressing in time with a reference signal, and selecting a first delay, first offset frequency, and first compression ratio that corresponds to a peak resulting from said correlating, wherein the said first delay, first offset frequency, and first compression ration representing the difference between the RF signal and the reference signal.

According to another aspect, a relative velocity is determined from the first compression ratio. In that, a new ambiguity function $S(\tau,\beta,\alpha)=\int_{-\infty}^{\infty}x(t)x(\beta*(t-\tau))*e^{j\alpha t}\,dt$ determined the $\tau$, $\alpha$ and $\beta$ representing delay, first offset frequency, and first compression respectively and relation $$\beta = \frac{1+\frac{v}{c}}{1-\frac{v}{c}}$$

is employed to determine the relative velocity.

According to another aspect the method of claim 4, further comprising determining the angle of arrival of the RF signal using a relation:

$$S(\tau, \beta, \alpha, \theta) = \int_{-\infty}^{\infty}\left(x(t)x\left(\beta*(t-\tau)-\frac{W^T p_n}{c}\right)^* e^{j\alpha t}\right)dt,$$

In that, $S(\tau,\beta,\alpha,\theta)$ representing the generic ambiguity function for the signal received at the $n^{th}$ antenna, $$\frac{W^T p_n}{c}$$

representing the additional delay of the RF signal has encountered to reach the n antenna placed at a position $p_n$, and the W representing direction cosine of a transmitter transmitting the RF signal with respect receiver antenna position $p_n$, and $\theta$ representing an angle.

According to another aspect, the method is applied to pulsed radar system for determining the range, Doppler and angle.

According to another aspect, the method is further applied to FMCW radar system, in that chirp representing a linearly varying frequency signal of a first bandwidth.

DETAILED DESCRIPTION OF THE PREFERRED EXAMPLES

Figure 1:
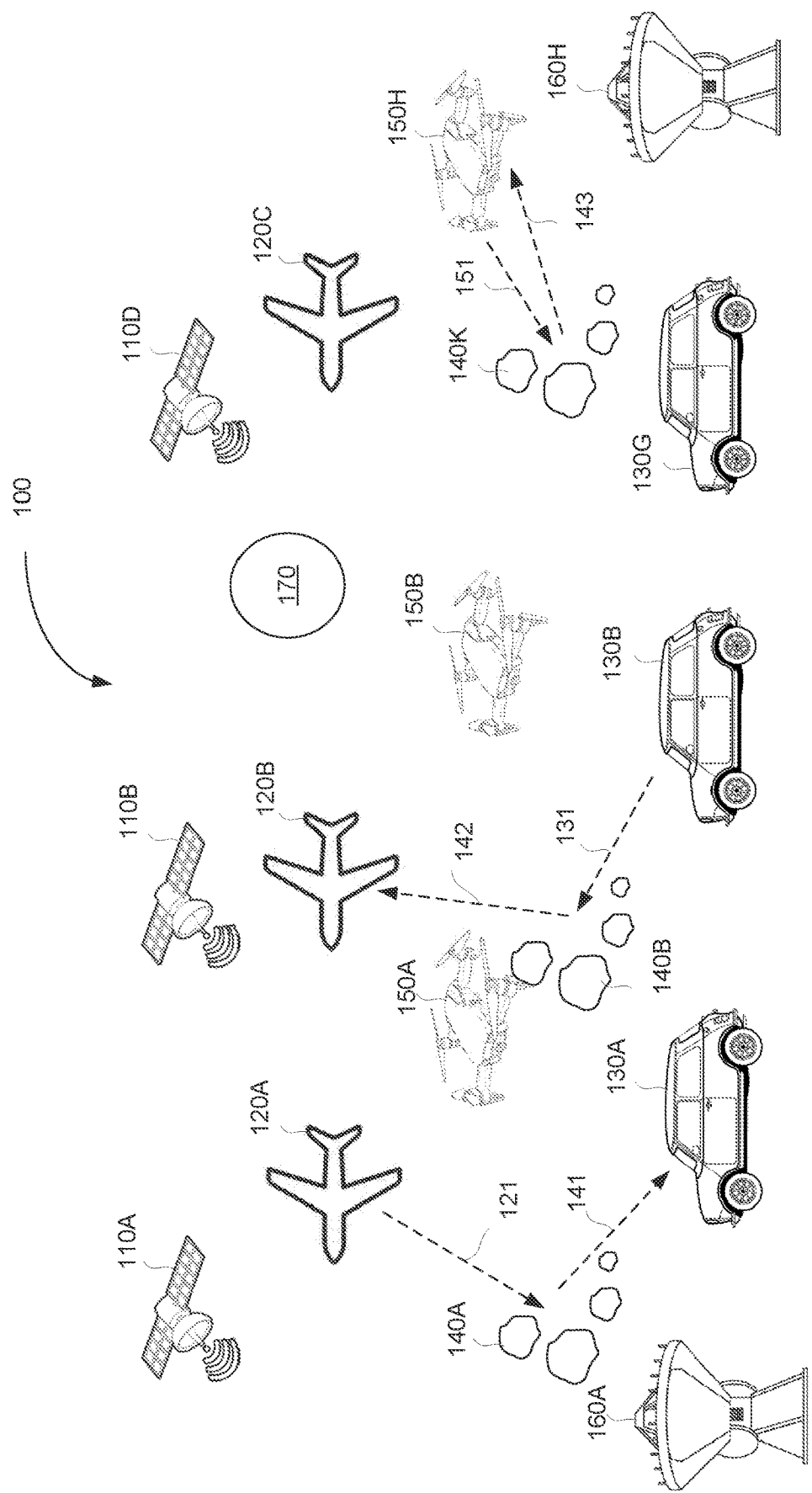
FIG. 1 is an example environment in which several aspects of the present invention may be seen.

FIG. 1 is an example environment in which several aspects of the present invention may be seen. The environment 100 is shown comprising satellites 110A-110D, aircrafts 120A-120C, ground vehicles 130A-130G, objects 140A-140K, UAVs 150A-150H, ground stations 160A-160H and communication channel 170. Each element is further described below.

The each satellite 110A-D transmits and receives data from one or more of aircrafts 120A-C, ground vehicles 130A-G, UAVs 150A-H, ground stations 160A-160H and from other satellites 110A-D. The satellites 110A-D in its transmit and receive mode of operation, may generate a signal by employing a local reference clock/oscillator for transmission and to receive a signal (to extract information) by employing the local reference clock/oscillator. In certain embodiment, the satellites may operate to relay the signal received from one or more aircrafts 120A-120C, ground vehicles 130A-130G, objects 140A-140K, UAVs 150A-150H and ground stations 160A-160H to other one's, for example to extend the communication range.

Similarly, each aircraft 120A-120C, ground vehicles 130A-130G and UAVs 150A-150H may operate to transmit/ receive a signal to/from other aircraft 120A-120C, ground vehicles 130A-130G and UAVs 150A-150H. In certain embodiment, the signal may comprise information. In certain other embodiment, signal may be a radar signal transmitted/received for detecting objects 140A-K and to determine object's parameters. The objects 140A-K may comprise stationary objects, moving objects, terrains, etc.

In certain embodiment, the satellites 110A-110D, aircrafts 120A-120C, ground vehicles 130A-130G, UAVs 150A-150H, and ground stations 160A-160H may comprise electronics mounted on the respective elements for surveillance, object detection, navigation, geographical positioning, for example. In certain other embodiments, the elements 110A-110D, 120A-120C 130A-130G, UAVs 150A-150H, and 160A-160H may participate in forming an ad-hoc networked communication system (MANET, for example) by routing the signal to the destination. The communication channel 170 is a wireless communication channel or medium (like free space) capable of transmitting/passing electromagnetic waves transmitted/refracted by the elements 110A-110D, 120A-120C 130A-130G, 140A-140K, UAVs 150A-150H, and 160A-160H.

In the environment 100, the elements may operate in one or more modes/configuration. For example, aircraft 120A may transmit a radar signal 121 and the corresponding reflected signal 141 by the object 140A is received by the ground vehicle 130A. As another example scenario, ground vehicle 130B may transmit a radar signal 131 and the corresponding reflected signal 142 by the object 140B is received by the aircraft 120B. As an yet another example, the UAV 150A is shown transmitting radar signal 151 and receiving the reflected signal 143 from object 140C. While the configurations or/modes are for illustrations, other modes and combination thereof are employed in the environment 100.

Figure 2:
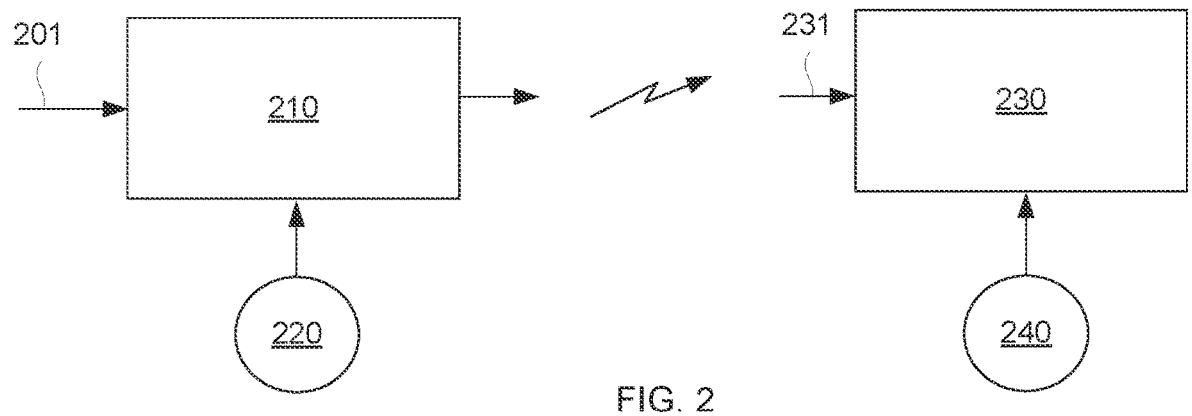
FIG. 2 illustrates the example transmitter and receiver operation.

FIG. 2 illustrates the example transmitter and receiver operation. The transmitter 210 and receiver 230 may be electronics (electronic system) employed within the elements 110A-110D, 120A-120C 130A-130G, 140A-140K, UAVs 150A-150H, and 160A-160H. The transmitter 210 is shown employing a local oscillator 220 (carrier signal or in general carrier) for transmitting information 201. In that, information may be embedded in the carrier (carrier is modulated) by way of amplitude, frequency and phase as is well known. The receiver 230 is shown employing a local oscillator 240 to demodulate the received signal 231 to extract information that is embedded in the amplitude/ frequency and phase of the received signal. As may be appreciated, local oscillators 220 and 240 are required to be in synchronisation to accurately determine the phase and/or frequency representing the information. Further, it may be appreciated that, even if the local oscillators are synchronised once, any drift in the local oscillator 220/240 may demand resynchronisation of receiver 230 with the transmitter 210.

Further, when at least any one of the transmitter and the receiver are in motion, the Doppler shift caused due to the motion affects the determination of the frequency/phase that represents the information. In one embodiment both offset/ drift and Doppler shifts due to motion are determined for synchronising the transmitter and receiver. In another embodiment, the time delay, drift, Doppler shift are determined at the receiver. In that, the time delay represents the time taken for the signal transmitted by the transmitter to reach the receiver. In certain embodiment, the receiver determines the time delay, drift, Doppler and angle of arrival of the received signal. For example, in case of radar signals, the time delay may represent the distance between the transmitter and the receiver, and the angle of arrival may represent the location of the transmitter or reflecting object.

Figure 3A:
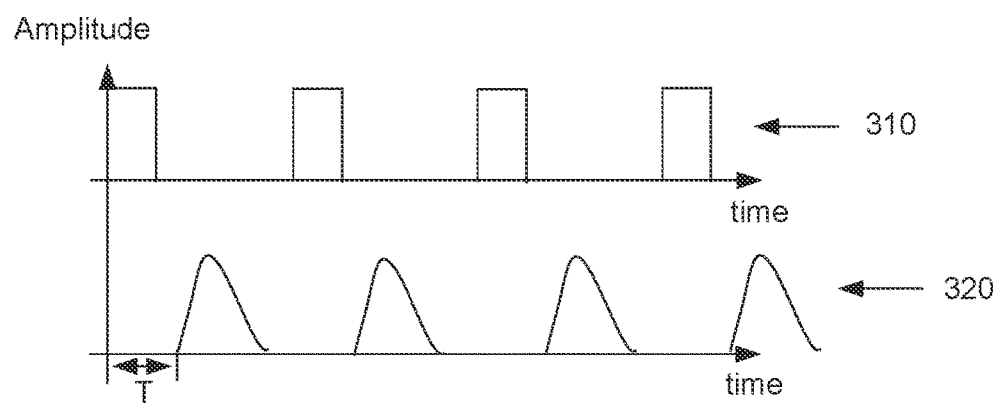
FIG. 3A is an example signal transmitted and received by the transmitter and the receiver.

FIG. 3A is an example signal transmitted and received by the transmitter 210 and the receiver 230. In that, 310 representing a pulse signal, 320 representing the corresponding received pulse signal and the time T representing the delay (time taken by the signal 310 to reach the receiver). The pulse signal 310 may be pulse transmitted by a pulse radar system to detect a target object.

Figure 3B:
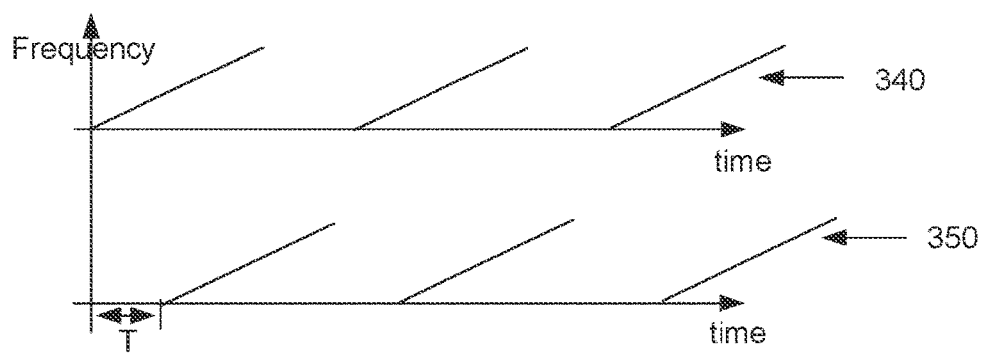
FIG. 3B is another example signal transmitted and received.

Similarly, FIG. 3B is another example signal transmitted and received by the transmitter and the receiver. In that, 340 representing a varying frequency signal (chirp) and 350 representing the corresponding received chirp signal. In that, the time T representing the delay. The chirp signal 340 may be FMCW (frequency modulated continuous wave) radar signal employed by a radar system for detecting the object, terrain, etc.

In certain embodiment, the transmitter 210 may transmit the signal 310 and/or 340. At the receiver 230 may determine the changes the transmitted signal 310 and/or 340 may have undergone like the time delay, frequency shift/drift, Doppler shift, direction of arrival. In certain other embodiment, transmitter 210 may transmit the signal 310 and/or 340 intermittently in between the transmission of data and/or information. In this scenario, the receiver may determine, time delay, drift/offset, Doppler shift, phase shift, etc., when the transmitter 210 transmit the signal 310 and 340. The receiver 230 may apply the determined time delay, drift/ offset, Doppler shift, phase shift for decoding the information subsequently. In certain other embodiment, the elements 110A-110D, 120A-120C 130A-130G, 140A-140K, UAVs 150A-150H, and 160A-160H may measures the relative speeds, time offsets, frequency offsets and convey that to the other elements that are participating in forming a networked communication for the purpose of tightly coupled and synchronized network of transceivers.

Figure 4:
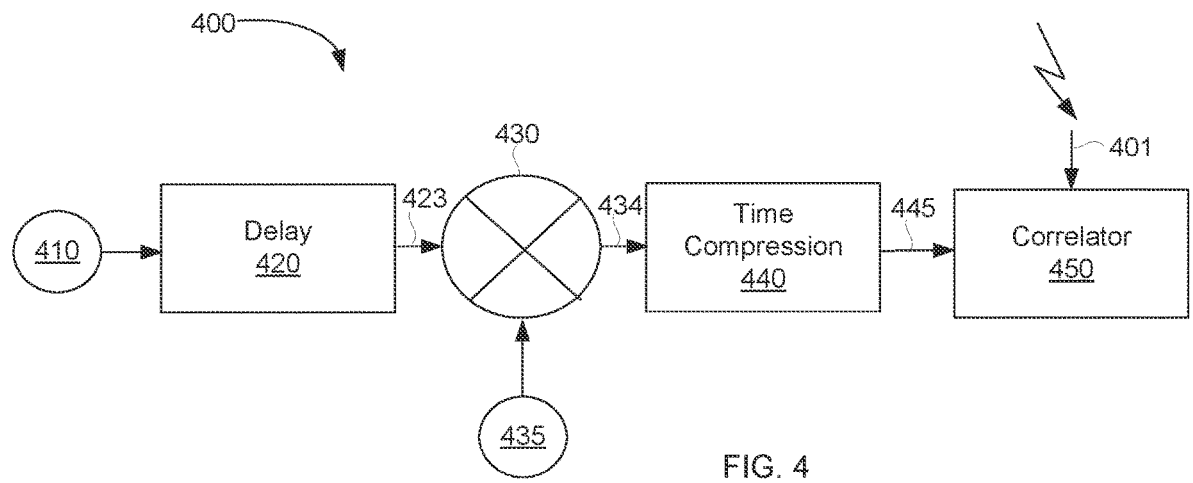
FIG. 4 is a block diagram illustrating an example receiver in one embodiment.

FIG. 4 is a block diagram illustrating an example receiver in one embodiment. The receiver 400 is shown comprising received signal 401, reference signal 410, delay element 420, multiplier (also may be referred to as Modulator or Frequency Multiplier) 430, time compression unit 440, and correlator 450. Each element is further described below.

The reference signal 410 is a locally generated version of the transmitted signal 310 and/or 340 at the receiver. The reference signal 410 may be generated locally using a local oscillator, phase locked loop, multiplier, divider and other circuitry as is well known. In other words, the reference signal 410 is a replica of the transmitted signal 310/340. In certain embodiment, where the transmitter and the receivers are implemented on a single chip or when they are on same location, same system (as in radar system for example), the reference signal 410 may be directly derived or coupled to the receiver from the transmitter section.

The delay element 420 adds a time delay $\tau$ (shifts the reference signal in time) to the reference signal. The delayed reference signal is provided on path 423. In certain embodiment, the delay element may add a set of delays ($\tau_1, \tau_2 \ldots \tau_n$) and store the corresponding set of delayed reference signals for further processing and/or provide the set of delayed reference signals on the path 423.

The multiplier 430 multiplies/modulates delayed reference signal on path 423 with an offset carrier frequency 435. In other words, the multiplier 430 shifts the delayed reference signal in frequency by a value $\alpha$. The frequency shifted and delayed reference signal is provided on path 434. In one embodiment, the multiplier 430 may generate a set of frequency shifted reference signals with shifted by value ($\alpha_1, \alpha_2 \ldots$). The one or more frequency shifted reference signal is provided on the path 434.

The time compression unit 440 compresses or expands the signal on path 434 by time and provides the time compressed signal on path 445. In one embodiment the time compression 440 may compress the signal by a factor $\beta$. In that a value greater than one may represent an expansion in time and a value less than one may represent the compression in time. In certain embodiment, the time compression may generate a set of compressed signal on path 445 with the corresponding compression value of ($\beta_1, \beta_2, \ldots$). The compressed signal is provided on path 445.

The correlator 450 correlates the compressed signal received on path 445 with the received signal 401. The value of the time delay $\tau$, frequency offset $\alpha$, and the compression value $\beta$ that provides maximum correlation value is used for synchronising the transmitter and the receiver. Though the receiver 400 is described with the arrangement of delay element 420, multiplier 430 and time compression 440 in that order, the order may be suitably altered maintaining the spirit. In certain other embodiment, the received signal 401 may be subjected to the time shift, frequency offset and time compression operations instead of the reference signal and the correlated with the reference signal 410.

In one embodiment, the Doppler shift is determined from the compression value $\beta$. Accordingly, the receiver 400 determines the delay, offset and dopplers shift between the transmitted signal and the received signal to synchronise and/or to extract information more accurately dynamically.

The operations of the receiver 400 may be represented by a relation:

$$S(\tau,\beta,\alpha)=\int_{-\infty}^{\infty}x(t)x(\beta^*(t-\tau))^*e^{j\alpha t}dt. \quad (1)$$

In that, the $S(\tau,\beta,\alpha)$ representing the ambiguity function that is computed in determining $\tau$, $\beta$, and $\alpha$, x(t) representing the received signal, $\times(\beta^*(t-\tau))^*e^{j\alpha t}$ representing the time delayed, frequency shifted and time compressed reference signal and vice-a-versa. Wherein $t-\tau$ representing the operation of the delay element 420, $e^{j\alpha t}$ representing the offset frequency shifting operation performed by the multiplier 430, $\beta^*(t-\tau)$ representing the time compression/expansion performed by the time compression 440 and "*" representing the complex conjugate.

In one embodiment, the velocity "v" is determined from the $\beta$ using relation:

$$\beta = \frac{1+\frac{v}{c}}{1-\frac{v}{c}}, \quad (2)$$

in that, c representing the velocity of light. Accordingly, in the relation (1) function $S(\tau,\beta,\alpha)$ may be represented as $S(\tau,v,\alpha)$, the velocity "v" representing the relative velocity between the transmitter and the receiver. In other words, the v represents the Doppler shift. It may be readily seen that the Doppler shift is determined from the compression factor $\beta$ contrary to determining Doppler shift directly as in a conventional communication system.

Referring to conventional system, in contrast to the relations (1) and (2) of the instant disclosure, conventional systems implementations may be represented as:

$$S(\tau,\omega_{dopp})=\int_{-\infty}^{\infty}x(t)x((t-\tau))^*e^{j\omega_{dopp}t}dt. \quad (3)$$

In that, $\omega_{dopp}$ is representing the Doppler frequency or offset frequency between the oscillators of Transmitter and Receiver. It may be appreciated that, the relation (3) is accurate only for a small range of frequency (bandwidth) of the transmitted signal. When the bandwidth of the signal is higher (for example the chirp bandwidth of signal 340), determination of Doppler shift in accordance with the relation (3) of conventional receiver becomes inaccurate as the Doppler frequency shift due to relative motion comes out of the narrow band assumption of the Transmitted signal.

In one embodiment, the receiver 410 is further configured to determine the angle of arrival $\theta$. Accordingly, the receiver 410 may be implemented to determine parameters $\tau$, v, $\alpha$ and $\theta$ and may be represented as $S(\tau,v,\alpha,\theta)$. The manner in which the receiver 410 may be further configured to determine the parameters $\tau$, v, $\alpha$ and $\theta$ in an embodiment is further described below.

Figure 5:
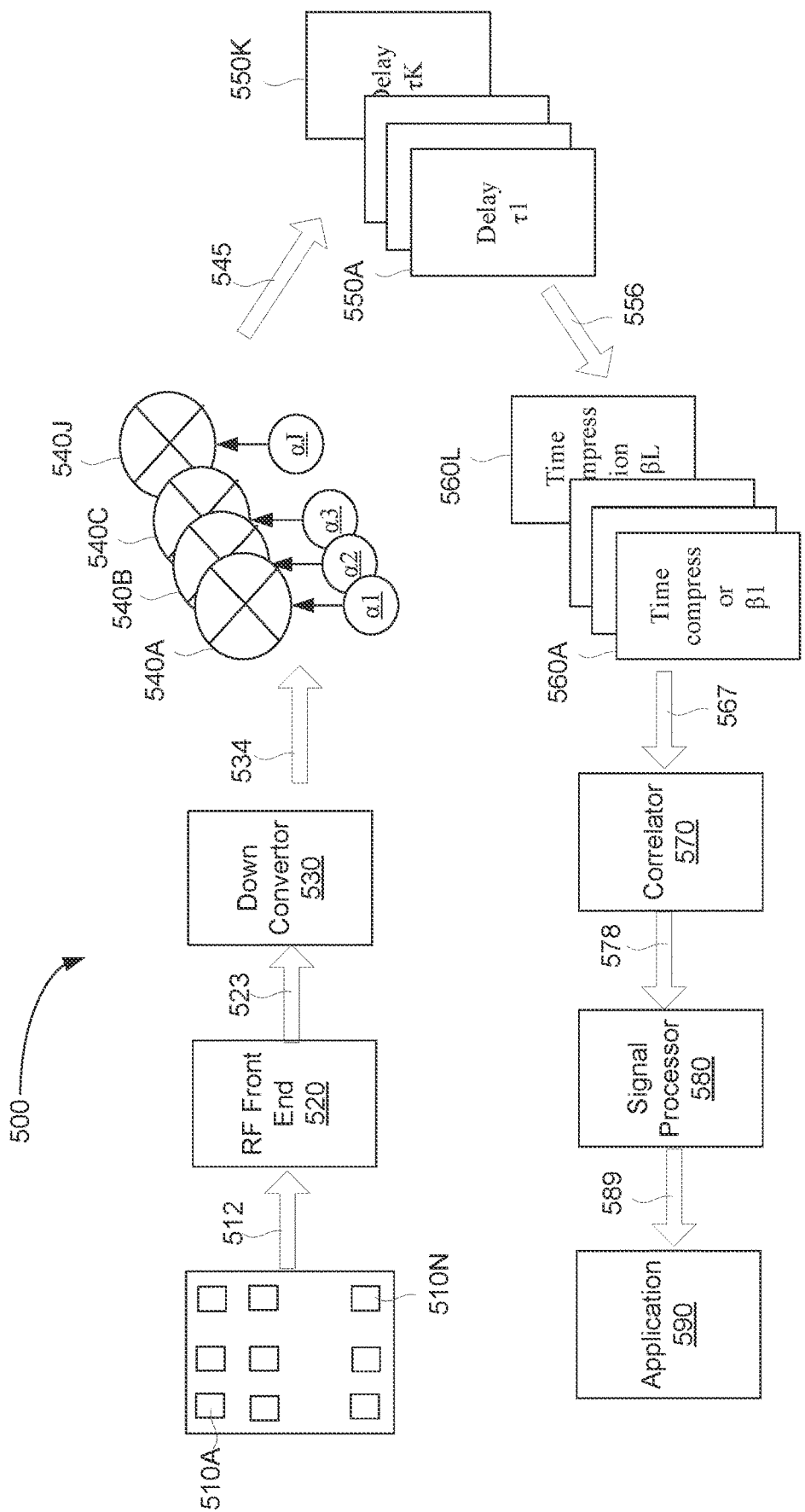
FIG. 5 is a block diagram of an example receiver in an embodiment.

FIG. 5 is a block diagram of an example receiver in an embodiment. The receiver 500 is shown comprising plurality of antennas 510A-N, RF front end 520, down converter 530, offset multipliers 540A-J, time delay units 550A-K, time compression units 560A-L, correlator 570, signal processor 580, and application unit 590. Each block is further described below.

The antennas 510A-N receives RF signal and provide the received signal on path 512. The antennas 510A-N may be arranged in a single or two dimensional arrays. The antennas 510A-N may be configured in a multiple input and multiple output configuration (MIMO) and the arrangement may be suitably selected to provide desired apertures. For example, the antenna 510A-N may be employed for beamforming, thus, beam apertures and/resolution of the beam may be adjusted by number of antennas and their geometrical arrangement. One or more known techniques for MIMO reception may be employed in deploying the antenna array. The path 512 represents path transferring set of data/signals received by the antenna 510A-N.

The RF front end 520 performs signal conditioning such as filtering, impedance matching, RF signal amplification, and filtering, for example. The signals received on each antenna may be independently conditioned for speed or multiplexed to reduce the hardware. In certain other embodiment, the RF front end 520 may comprise digitiser that convert analog RF signal to digital stream of data for parallel or series processing. The down converter 530 may down covert the received signal to an intermediate frequency for processing. The down converter may be optionally implemented in the analog or digital mode of operation.

The offset multipliers 540A-J shifts the received signal by a set of offset frequencies (A-J). Accordingly, RF signal received on each antenna 510A-N is shifted by J number of offset frequencies. Thus, a total of N×J number of RF signal is provided on path 545. For example, as noted in the relation (1), the set of offset frequency may comprise L number of offset frequencies represented as $\alpha_1, \alpha_2, \ldots \alpha_L$. In one embodiment, the $\alpha_1, \alpha_2, \ldots \alpha_L$ may be selected in conjunction with the expected drift in the transmitter reference clock. The set of frequency shifted RF signals (N×J) are provided on path 545.

The time delay units 550A-K adds set of time delays (A-K) to each RF signal receive on path 545. Accordingly each RF signal (N×J) received on path 545 is time delayed by K delay elements to generate N×J×K number of Signals. For example, as noted in the relation (1), the set of time delays may comprise K number of time delay units represented as $\tau_1, \tau_2, \ldots \tau_K$. In one embodiment, the $\tau_1, \tau_2, \ldots \tau_K$ may be selected in conjunction with the expected distance between the transmitter and the receiver and/or the total distance the signal may travel when object is reflecting the transmitted signal. The time shifted signals (N×J×K) may be provided on path 556.

Figure 6:
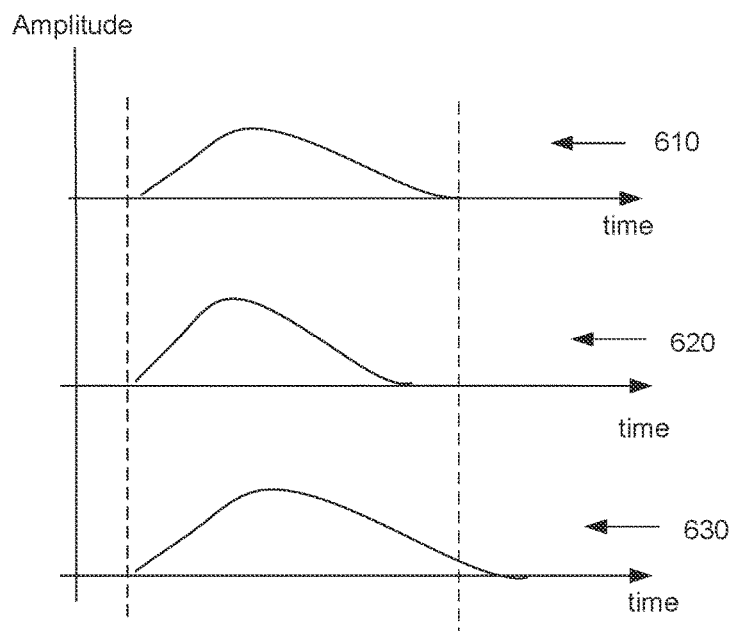
FIG. 6 illustrates the time compression of the signal.

The time compression units 560A-L, compresses each RF signal (N×J×K) received on path 556 by a set of compression factors. Accordingly, each RF signal (N×J×K) received on path 556 is compressed by M number of compression factors to generate (N×J×K×L) number of signals. For example, as noted in the relation (1), the set of compression factors may comprise M number of compression units represented as $\beta_1, \beta_2, \ldots \beta_M$. In one embodiment, the $\beta_1, \beta_2, \ldots \beta_M$ may be selected in conjunction with the expected velocity of the transmitter and receiver. The time compressed signals (N×J×K×L) may be provided on path 567. FIG. 6 illustrates the time compression of the signal. In that, curve 610 representing the received signal (alternatively equivalent to when compression ratio is unity). Curve 620 represents the compressed received signal with compression ratio less than one. Curve 630 representing the compressed signal with compression ratio greater than unity. The compression may be performed in digital or analog domain. In that, the compression ratio β less than one may be implemented interpolation or removing samples. Similarly, the compression ratio β greater than unity may be implemented by extrapolation or adding dummy samples in the extended time period.

As may be appreciated the signal (data if and when digitised) on path 567 is four dimensional. If only one antenna is used for receiving (i. e. N=1), the data received on path 567 is three dimensional. Similarly, the value of N, J, K, and L may be adjusted to generate a 4-dimensional data or a 3-dimensional data etc.

The correlator 570 correlates signal received any one of the antenna on path 567 with the reference signal to generate a correlation results. Accordingly, the correlator may generate J×K×L correlation results corresponding to one antenna. The maximum value (or peak value) among the J×K×L correlation results is selected for identifying the corresponding α, τ, and β. The selected α, τ, and β represents the, frequency offset, delay and the (relative velocity/doppler shift). The correlation results are provided on path 578. Alternatively, in another embodiment, the transmitter and receiver may employ beamforming and time shift, frequency shift and time compression may be operative in conjunction with the beamformers to produce J×K×L correlator outputs.

The signal processor 580 receives the correlation result to determine the Doppler shift, time delay and offset frequency. For example signal processor 580 may detect the peak and determine the corresponding α, τ, and β values. Further, the processor 580 may be further configured to determine the relative velocity "v" from the compression ratio β using relation (2). The determined offset, delay and Doppler shift is provided on path 589.

The application unit 590 may perform one or more operations using the offset, delay and Doppler shift. In one embodiment, the application unit 590 may determine the location of the transmitter/object reflecting the signal and accordingly control the receiver or the vehicle in which the receiver is mounted. Alternatively may navigate the vehicle. In certain other embodiment, application unit 590 may apply the determined offset, delay and Doppler shift to the received signal/reference signal. Such that, the receiver may decode the data more accurately.

Though the correlator 570 is shown correlating the received signal (J×K×L) with the reference signal, three dimensional correlation techniques may be adopted. In certain other embodiment, the correlator 570 may be implemented to correlate the received signal stage by stage. For example, in the first stage, correlator may be implemented to correlate with the offset frequency shifted L signals. In the second stage correlator may be implemented to correlate with the K delayed signals. In the third stage, the correlator may be implemented to correlate with the time compressed signals. The manner in which the angle of arrival may be determined is further described below.

in one embodiment, the receiver 230 may determine the angle of arrival using a relation:

$$S(\tau, \beta, \alpha, \theta) = \int_{-\infty}^{\infty} \left( x(t) x \left( \beta * (t - \tau) - \frac{W^T p_n}{c} \right)^* e^{j\alpha t} \right) dt. \quad (4)$$

In addition to the references noted with respect to the relation (1) and (2) above, in the relation (4) $S(\tau,\beta,\alpha,\theta)$ representing the generic ambiguity function for the signal received at the "n"th antenna (when more than one antennas are employed for receiving and/or transmitting), $$\frac{W^T p_n}{c}$$

representing the additional delay the wavefront from a source (transmitting antenna) has taken to reach the "n"th antenna placed at a position $p_n$, and the W representing direction cosine of the transmitter with respect receiver antenna position, and θ representing an angle of arrival that is normal to the plane of the antenna array 510A-N.

In one embodiment, position $p_n$ may be represented in Cartesian coordinate as vector $p_n=(p_{xn}, p_{yn}, p_{zn})$, with any one of the antenna in the array considered to be at origin (0, 0, 0). The direction cosines of the transmitter W may be represented in another three dimensional vector that is function of azimuth angle θ and elevation angle φ of the transmitter with respect to the origin. Thus, W may be represented as W=(cos θ cos φ, sin θ cos φ, sin φ). The ambiguity function (4) may be computed for every antenna element in the array of antennas and added (or suitably weighted and added) together to get a combined ambiguity function. The peak in the combined ambiguity function determines) or identifies the optimal values of parameters τ, β,α, θ and φ(through W and p)

Alternatively, the RF signal corresponding to the maximum correlation value is measured across all the antennas 210A-N for determining the angle of arrival. Accordingly, the corresponding RF signal received across all the antennas are multiplied with set of angles $\theta_1, \theta_2 \ldots \theta_N$ and correlated for determining the specific angle that results with a peak value. In an alternative embodiment, a fast Fourier transform operation (FFT) is performed across the antenna for the RF signal received to determine the spatial frequency corresponding to the angle of arrival (angle θ).

Figure 7:
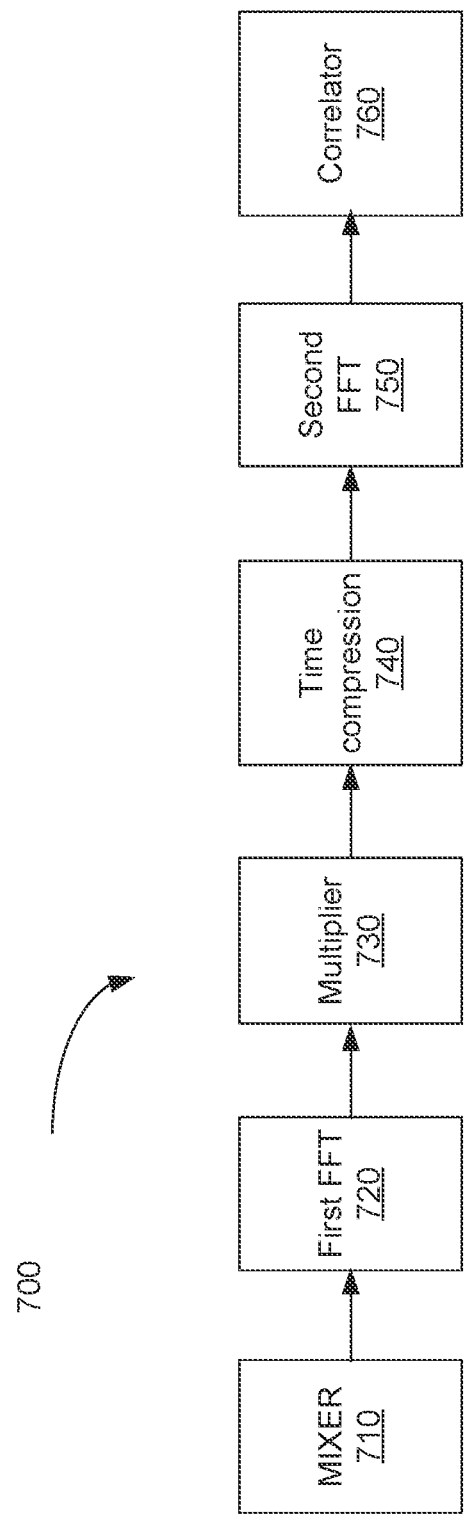
FIG. 7 is a receiver illustrating an example receiver configured for FMCW signal reception.

FIG. 7 is a block diagram illustrating an example receiver configured for FMCW signal reception. The receiver 700 is shown comprising mixer 710, first FFT block 720, multiplier 730, time compression unit 740, second FFT 750, correlator 760. In that, the mixer 710 mixes the received RF signal 701 with a carrier frequency to down covert the received RF signal. The first FFT perform the FFT operation on the received RF signal across multiple received RF chirps to determine the delay or range. The multiplier 730, compression unit 740 and correlator 760 perform operation similar to the corresponding multipliers 540A-J, time compression units 560A-L, and correlator 570. The second FFT 750 perform FFT operation across antennas 610A-N.

In an alternative embodiment, the second FFT 750 may be replaced with a processor configured to compute $$\frac{W^T p_n}{c}$$

for each antenna 610A-N and determine the azimuth and elevation angle using the relation W=(cos θ cos φ, sin θ cos φ, sin φ) and (4).

While various embodiments of the present disclosure have been described above, it should be understood that they have been presented by way of example only, and not limitation. Thus, the breadth and scope of the present disclosure should not be limited by any of the above-discussed embodiments but should be defined only in accordance with the following claims and their equivalents.

What is claimed is:

1. A method in a wireless communication receiver comprising:
   receiving a radio frequency (RF) signal;
   delaying the RF signal with a set of time delays;
   shifting the RF signal with a set of offset frequencies;
   compressing in time the RF signal with a set of compression factors;
   correlating the RF signal after subjecting to said delaying, shifting and compressing in time with a reference signal; and
   selecting a first delay, first offset frequency, and first compression ratio that corresponds to a peak resulting from said correlating,
   wherein the said first delay, first offset frequency, and first compression ratio representing the difference between the RF signal and the reference signal.

2. The method of claim 1, further comprising determining a relative velocity from the first compression ratio.

3. The method of claim 2, wherein the first delay, first offset frequency, and first compression is determined using a relation:
   $S(\tau,\beta,\alpha) = \int_{-\infty}^{\infty} x(t)x(\beta*(t-\tau))*e^{j\alpha t}dt$, wherein τ, α and β representing delay, first offset frequency, and first compression respectively, x(t) representing the reference signal and $x(\beta*(t-\tau))*e^{j\alpha t}$ representing the RF signal subjected to said delaying, shifting and compressing in time.

4. The method of claim 3, wherein the relative velocity is determined using relation:

$$\beta = \frac{1 + \frac{v}{c}}{1 - \frac{v}{c}},$$

in that, v representing the relative velocity and c representing velocity of light.

5. The method of claim 4, further comprising determining an angle of arrival of the RF signal using a relation:

$$S(\tau, \beta, \alpha, \theta) = \int_{-\infty}^{\infty} \left( x(t)x\left(\beta*(t-\tau) - \frac{W^T p_n}{c}\right)^* e^{j\alpha t}\right) dt$$

In that, S(τ,β,α,θ) representing the generic ambiguity function for the signal received at the "n"th antenna, $$\frac{W^T p_n}{c}$$

representing the additional delay of the RF signal has encountered to reach the "n"th antenna placed at a position $p_n$, and the W representing direction cosine of a transmitter transmitting the RF signal with respect receiver antenna position $p_n$, and θ representing an angle.

6. The method of claim 5, wherein the reference signal is replica of a transmitted signal that is received as the RF signal.

7. The method of claim 5, wherein the reference signal is a radar signal transmitted from a transmitter and the RF signal is reflection of the radar signal from an object.

8. The method of claim 7, wherein the radar signal comprises sequence of pulses of a pulsed radar system.

9. The method of claim 8, wherein the radar signal comprises a sequence of chirps of a frequency modulated continuous wave (FMCW) radar system, in that chirp representing a linearly varying frequency signal of a first bandwidth.

* * * * *